Feb. 8, 1944.  F. H. BATEMAN  2,341,352
POTATO PLANTER
Filed Jan. 15, 1941  4 Sheets-Sheet 2
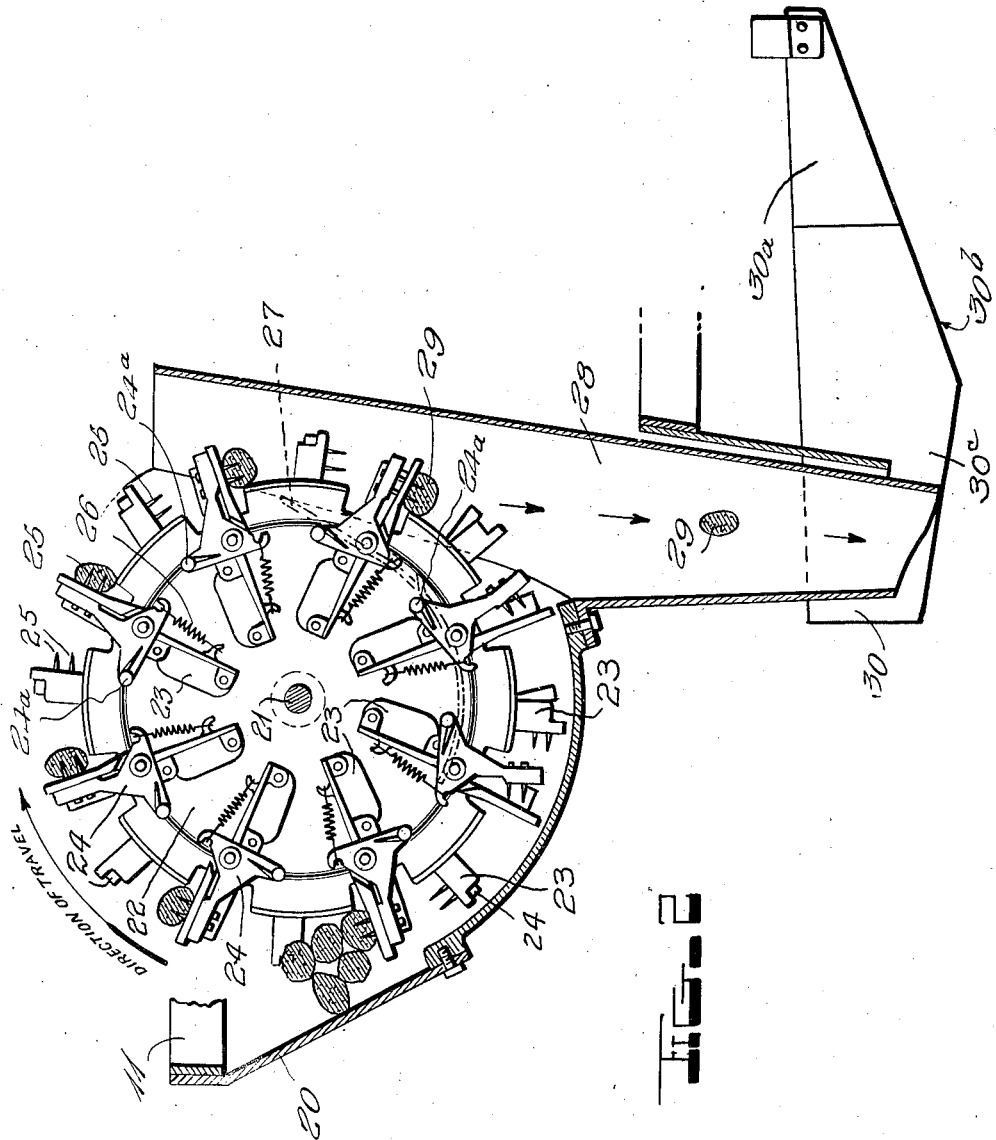
INVENTOR.
Frederic H. Bateman
BY
ATTORNEY Feb. 8, 1944.   F. H. BATEMAN   2,341,352
POTATO PLANTER
Filed Jan. 15, 1941   4 Sheets-Sheet 3
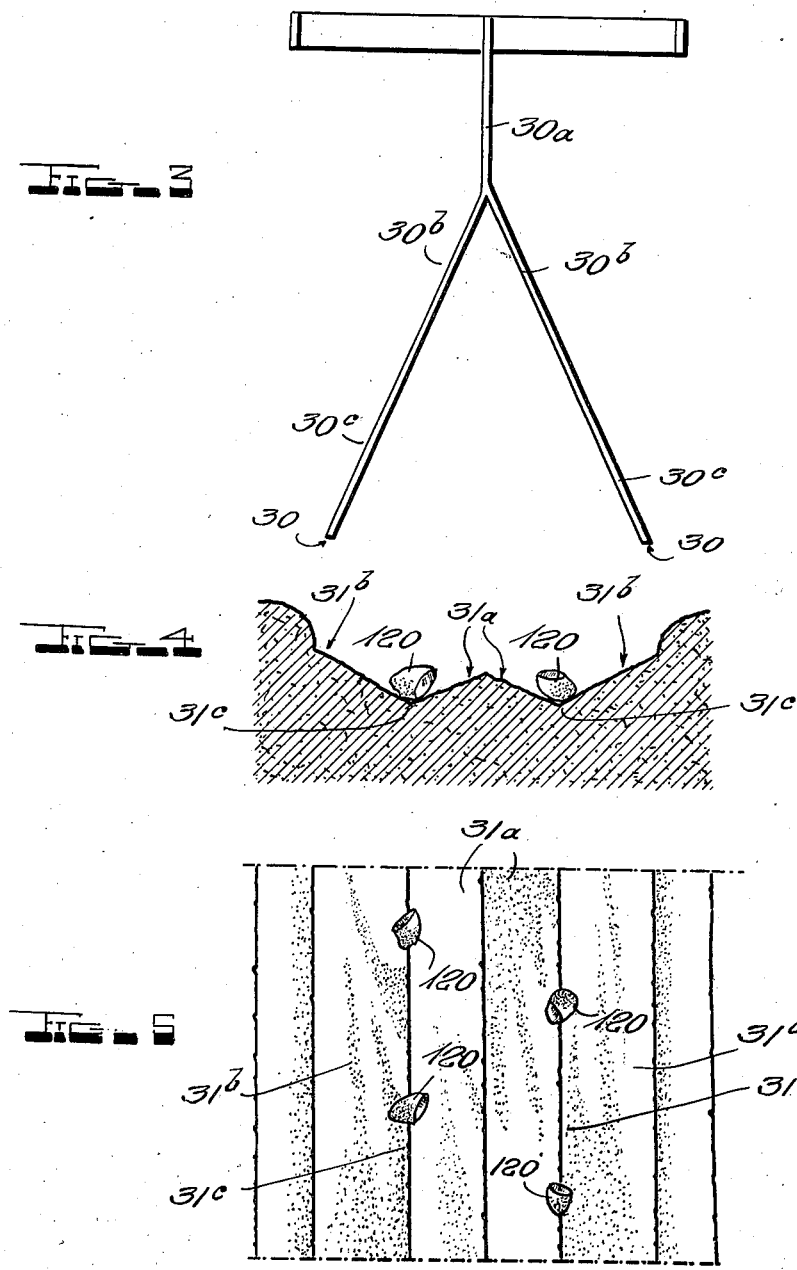
INVENTOR.
Frederic H. Bateman
BY
ATTORNEY Feb. 8, 1944.     F. H. BATEMAN     2,341,352
POTATO PLANTER
Filed Jan. 15, 1941     4 Sheets-Sheet 4
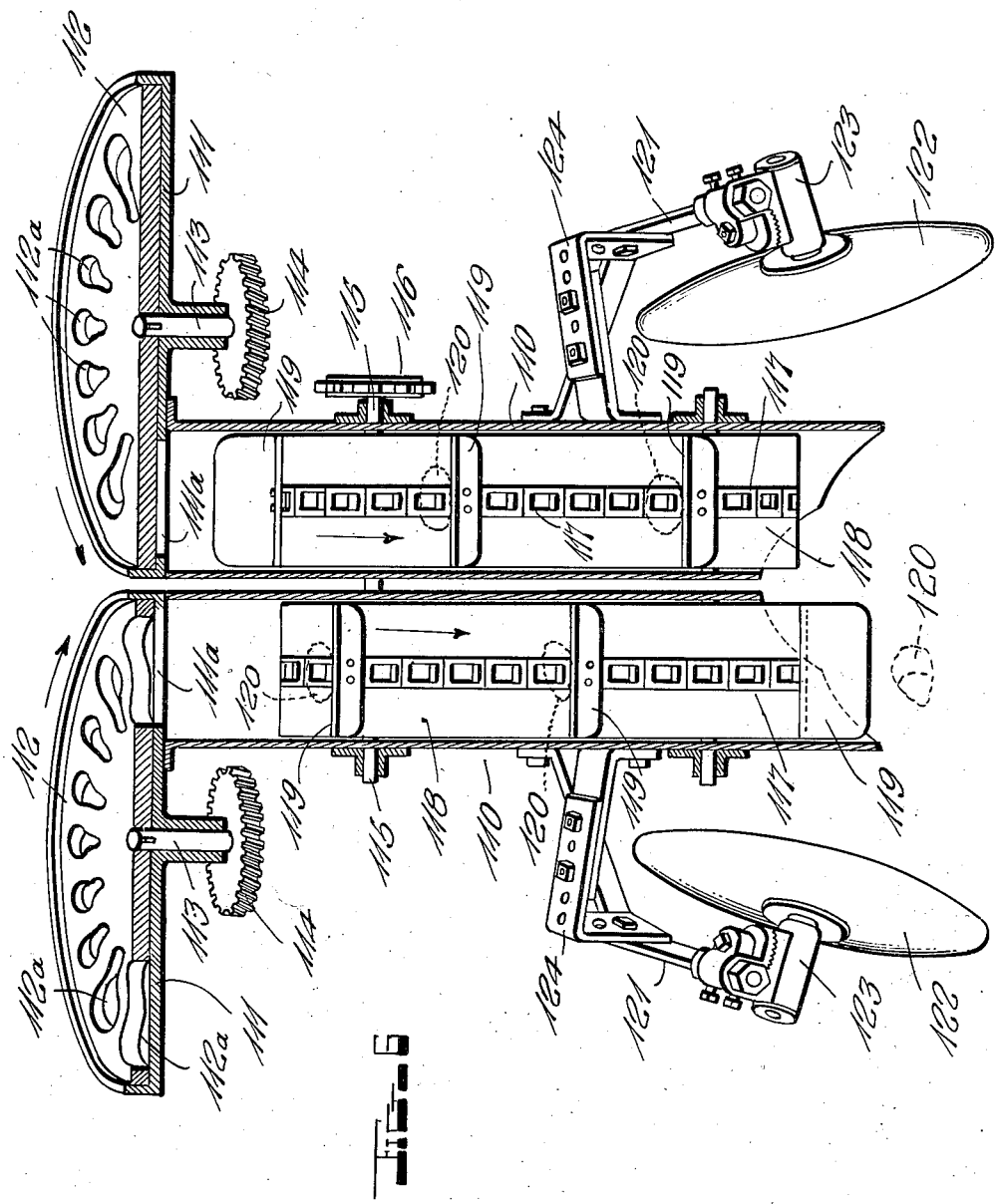
INVENTOR.
Frederic H. Bateman
BY
ATTORNEY Patented Feb. 8, 1944

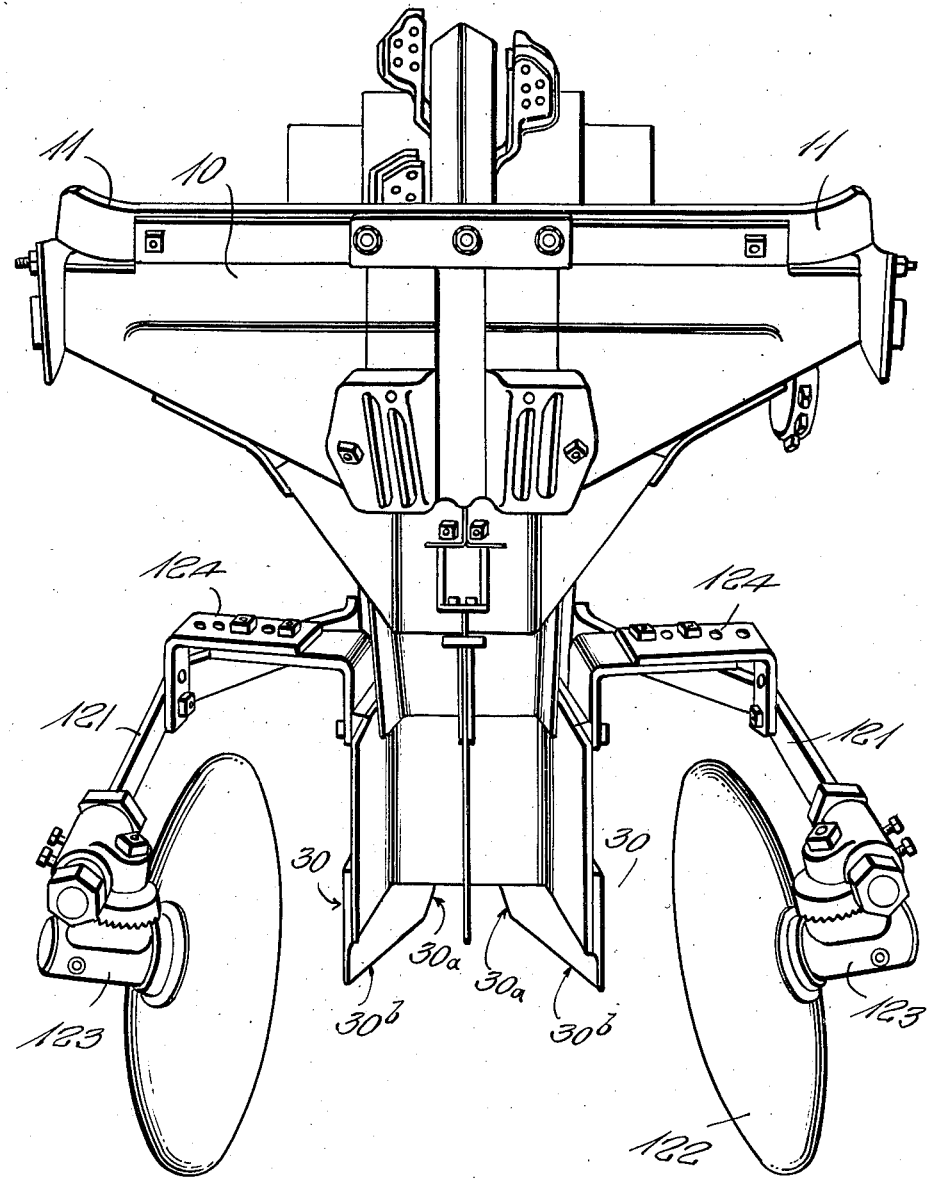

2,341,352

UNITED STATES PATENT OFFICE 2,341,352

POTATO PLANTER

Frederic H. Bateman, Washington Township, Gloucester County, N. J., assignor to Fred H. Bateman, Grenloch, N. J., and Camden Trust Company, a corporation of New Jersey, trustees under the will of Ellen M. Bateman, deceased Application January 15, 1941, Serial No. 374,563

8 Claims. (Cl. 111—34)

This invention relates to planters and particularly to potato planters.

One of the great problems in the raising of potatoes is the conservation of fertilizer so that it is not only not wasted but that a proper amount of fertilizer is made available to the plant at the proper time. Equally important and sometimes more important is the maximum use of the land available so as to obtain a maximum yield per acre.

The primary object of this invention is the provision of an improved potato planter.

Another object is the provision of a potato planter wherein two rows of potatoes are planted in a single furrow or what might be termed a single furrow twin-row or double row.

A further object of the invention is the provision of an improved potato planter wherein are two guide means located close to the rear of a furrow opening means so as to place two rows of potatoes close together in a single furrow.

A still further object of the invention is the provision of an improved potato planter wherein are two seed selector units having alternately spaced selectors which deliver seeds to guide means to deposit the seeds in staggered relation in a single furrow.

Another and still further object of the invention is the provision of an improved planter wherein is provided a furrow opener having means to cause two spaced low portions in a single furrow to receive seeds in two rows in the same furrow.

Still another and further object of the invention is the provision of a potato planter for planting two rows in a single furrow wherein seed selecting means alternately drop seeds in first one side, then the other side in the furrow.

Still another object of the invention is the provision of a potato planter for planting two rows in a single furrow wherein two seed selecting means alternately drop seeds in first one side then the other side in the furrow.

Other and further objects of the invention will be apparent to those skilled in the art from a reading of the complete specification and claims.

Referring to the drawings wherein I have illustrated my invention,

Fig. 1 is a perspective view of one form of the invention shown with parts of the potato planter omitted for the sake of clearness.

Fig. 2 is a sectional view showing the details of one form of seed-selecting means.

Fig. 3 is a plan view of the ground opening means.

Figs. 4 and 5 are respectively cross section and plan views of a furrow showing the two longitudinally extending low portions giving a W-cross-section of the furrow.

Fig. 6 is a fragmental sectional view of another type of seed selecting and dropping means, being an adaptation of structures shown in U. S. Patents 1,912,248 and 2,053,390, in which patents I appear as a joint inventor.

Similar reference characters refer to the same or similar parts throughout the specification and drawings.

Referring particularly to Figs. 1 and 2, 20 designates the lower portion of a hopper for seed potatoes below a frame to which it is secured.

In the use of this invention with the type of seed selecting device shown in Fig. 2, I may use two rotary selectors side by side as illustrated in Fig. 2, one feeding the seed to one side of the furrow and the other to the other side. This type of selector is known as the picker type and is shown and described in U. S. Patents Nos. 1,963,036 and 2,071,324.

A rotary shaft 21 carries two rotary picker carriers 22. The pickers have bodies 23, secured to the carirers 22. Pivoted to the picker bodies 23 are pick carriers 24 which carry the picks 25. The picks 25 extend through openings in the picked bodies and engage the seeds at the proper time. Springs 26 hold the picks normally extended in the engagement position.

The pick arms have cam lugs 24a which when they revolve, successively engage a cam 27 as shown at the right of Fig. 2. As the cam lug 24 rides up on the cam, the picks 25 holding the seed against the picker bodies are pulled out of the seed at a time when the seed is above the seed guiding means as the tube 28. The seed 29 then falls down the guiding means. Upon reaching the ground, the seed is deposited in one side of a W-cross-section furrow as will be presently described. It will be noted that the sides of the chute 23, at the bottom, are so shaped that the potato seed cannot escape at the sides as it contacts the ground and also that the rear edge of the bottom of the chute is sufficiently high to permit passage of the seeds as the chute moves forward.

The seed selecting means may be two such devices as has just been described and with these picker means staggered as shown, and in position to deliver—each to its own guiding means—no special construction is necessary to switch the seeds first to one side of the furrow and then to the other.

At the bottom of the guide means which as illustrated in Fig. 1 are side by side, is a furrow opening means 30. The guide tubes 28 are located at the rear of and in side by side relation in the path of the furrow opening means 30. This furrow opening means is provided with a forward blade opener portion 30a, a dividing portion 30b which provides the surfaces 31a of the furrow. Rearward of the portions 30b are the wing portions 30c which throw the earth aside and form the two outer surfaces 31b of the furrow. From Fig. 4 and the shape of the ground opening means 30 as shown in Figs. 2 and 3, it is clear that the furrow bottom is of W-shaped cross-section. Since the lower ends of the guides 28 are respectively over the respective low portions 31c of the furrow, it is clear from the foregoing that the seed will be deposited in the same furrow, in two rows with the seeds in staggered relation.

In Fig. 6 is illustrated a rear view of the seed selecting mechanism similar to that shown in U. S. Patent No. 2,053,390 but adapted to use with this invention. The showing illustrates the seed depositing mechanism from the rear.

The feeding mechanism is essentially a pair of disks with seed openings feeding the seeds to the dropping mechanism. As the two devices are similar except that the disks rotate in opposite directions, only one will be described.

At the top of a delivery guide chute 110, is a circular table 111 on the top of which revolves a feeding disk 112 having seed openings 112a. This seed feeding disk revolves in the direction indicated by the arrow in Fig. 6 so that the adjacent sides of the disks are coming to the rear of the machine—toward the operative. The disk 112 is mounted on a shaft 113 upon the end of which is a worm gear 114 suitably operated from worm gear mechanism, not shown.

The circular table 111 is provided with an opening 111a which is in a position to register, with the openings 112a, one at a time, as the disk 112 is revolved. This opening 111a is over the top of and discharges into the guide chute 110. It is to be here noted that the opening 111a at the left is in registration with one of its coacting openings 112a of its disk 112 while the right hand opening 111a is out of registration with all of its openings 112a of the right hand feeding disk 112. In the operation of this device in its preferred form, this relation of one on one side in registration with an opening 112a and the opening 111a on the other side out of registration with all of its openings 112a of its disk 112, is continuously maintained and as registration takes place on one side, registration ceases on the other side. It is to be understood that the seeds may be placed in the openings 112a either by hand or mechanically as indicated in U. S. Patent No. 1,912,248.

Within the guide chute 110, may be mounted an endless carrier which serves as a dropper for the seeds. A shaft 115 is mounted in the sides of the chutes 110 and extends from the outer side of one to the outer side of the other and is suitably driven as by the sprocket wheel 116. On the shaft 115 is mounted a pair of sprocket wheels upon which endless carrier chains 117 are mounted. At the bottom of the chute 110 are idler sprockets over which the chains 117 travel. From the top of the sprocket on the shaft 115 to near the bottom of the chute 110, there is a back guard 118 to hold the potato seed in the proper path. On the chain 117 are mounted conveyor shelf plates 119. These are so shaped that they substantially fill the cross section of the guide chute 110.

The operation of the sprocket 116 and its shaft 115 is such that the potato seeds when dropped on a shelf plate 119 will remain there until discharged into the furrow at the bottom of the guide chute 110. It is to be noted that while the two chains 117 are mounted on and operated from the shaft 115, the shelf plates 119 are in staggered relation to each other as is the case with the registration between the respective openings 111a and the coacting openings 112a. It is also to be here noted that with the passing of the space between each two shelf plates 119, there is the opening and closing of one of the openings 111a by the space between two of the openings 112a. This is to effect the discharge of one potato seed 120 between each two shelf plates 119 so that as each shelf plate 119 approaches the bottom position of its travel, it will discharge a seed into its side of the furrow. And since the openings 111a open and close alternately and in accord with the passage of the shelf plates 119, and since the latter alternate in operation as to the different chutes 110, it is clear that the potato seeds will be deposited in two rows with adjacent seeds in staggered relation. If desired, the chain 117 and its shelf plates may be removed and the seed be deposited directly upon the ground.

In both of the adaptations as illustrated in Figs. 1 and 5, rearwardly extending arms 121 of the frame, support covering disks 122 which are adjustably supported from the frame member 122 by the universal adjustment device 123. Adjustable braces 124 are provided to hold the guide chute 110 in proper relation to the frame members 121 and to the covering disks 122.

In operation as the potato planter carrying this invention passes over the ground, the selector mechanism whether of the type shown in Fig. 1 or that illustrated in Fig. 5 alternately delivers potato seeds to the opposite sides of the bottom of the furrow and in staggered relation in a single furrow. This arrangement of the plantings is economical as to fertilizer deposits and also very economical on space.

It is to be understood that while two adaptations as to different types of planters are shown that many other types may be used and that while I have illustrated and described my invention as applied to these adaptations in detail, it is to be understood that the disclosure is merely illustrative and that modifications and changes may be made without departing from the spirit of the invention and within its scope as claimed.

Having described my invention what I claim is:

1. A potato planter comprising a hopper, a selector for taking seeds from the hopper, a single furrow opening means and means to receive the seed from the selector and deliver them to the single furrow in a double row and to deposit the seeds in alternate spaced relation to the center line of the furrow.

2. A potato planter comprising a hopper, a selector for receiving seeds from the hopper, a single furrow opener, means comprising members for cutting oppositely disposed depressions in the bottom of the furrow to receive the seeds on opposite sides of the raised center line of the furrow and means to guide the seeds from the selector to the single furrow and deposit them in a double row, in staggered spaced relation to adjacent potatoes in the adjacent row.

3. A potato planter comprising a single furrow opening means, a hopper, a selector mechanism operatively connected to the hopper and including a pair of closely contiguous picker means, each picker means having its pickers circumferentially staggered relative to the pickers of the other picker means, means for guiding the seeds and depositing them in a double row in the same furrow.

4. A potato planter comprising a single-furrow opening means, a hopper, a picker mechanism operatively connected to the hopper and comprising a pair of closely contiguous picker means, guide means for receiving the seed from the picker means and means for releasing the seeds and depositing them in staggered relation to the next nearest seeds and in a double row in the same furrow.

5. A potato planter comprising a single-furrow opening means, a hopper, a pair of transversely placed guide means having their outlets adjacent and to the rear of the sides of the furrow opening means, and picker means operatively connected with the hopper to deposit seeds in the guide means alternately to produce two closely adjacent rows of seeds in the same furrow.

6. A potato planter comprising a single-furrow opening means, a pair of rotary selector means mounted adjacent each other and each having selecting elements circumferentially spaced with relation to the selectors of the other selector means, a guide means for each selector and having their discharge ends side by side over the path of the furrow opening means and means for closing the furrow.

7. A potato planter comprising a single-furrow opening means, a selector mechanism including two series of delivering means in close relation to each other, the delivering means of one series being in alternate operation to the delivering means of the other series and means for guiding the seeds to positions in a double row in the same furrow and in staggered relation to the next nearest seeds.

8. A potato planter comprising means for lifting the earth to form a single furrow and for cutting two contiguous relatively low portions in the furrow and a relatively high portion therebetween, selector means for making two series of single seed deposits, a pair of closely placed chutes in position to receive the respective potato seed deposit series from the selector means and to guide the seeds down to the respective sides of the relatively high portion of the furrow and in definitely close but spaced relation to each other, the sides of the chute at the bottom being close enough to the furrow bottom to prevent escapement of the seeds at the sides of the chute, the latter having a rear edge high enough to pass over the deposited seed.

FREDERIC H. BATEMAN.